US005513035A

United States Patent [19]
Miyatake et al.

[11] Patent Number: 5,513,035
[45] Date of Patent: Apr. 30, 1996

[54] INFRARED POLARIZER

[75] Inventors: Yoshito Miyatake, Neyagawa; Shinya Sannohe, Osaka, both of Japan

[73] Assignee: Matsushita Electric Industrial Co., Ltd., Kadoma, Japan

[21] Appl. No.: 294,951

[22] Filed: Aug. 24, 1994

Related U.S. Application Data

[62] Division of Ser. No. 888,773, May 27, 1992, Pat. No. 5,357,370.

[30] Foreign Application Priority Data

May 29, 1991 [JP] Japan ................................ 3-124312

[51] Int. Cl.⁶ ............................ G02B 1/08; G02B 1/10; G02B 5/30; G02B 27/28
[52] U.S. Cl. ...................... 359/352; 359/359; 359/487; 359/488; 359/583
[58] Field of Search ..................... 359/352, 487, 359/488, 500, 359, 583

[56] References Cited

U.S. PATENT DOCUMENTS

| | | | |
|---|---|---|---|
| 2,492,809 | 12/1949 | Marks | 359/488 |
| 2,748,659 | 6/1956 | Geffcken et al. | |
| 2,810,324 | 10/1957 | Marks | 359/488 |
| 2,982,178 | 5/1961 | Marks | 359/488 |
| 3,026,763 | 3/1962 | Marks | 359/488 |
| 3,439,968 | 4/1969 | Hansen et al. | |
| 3,765,746 | 10/1973 | Ashley et al. | |
| 4,219,867 | 8/1980 | Zehender | |
| 4,464,018 | 8/1984 | Gagnon | |
| 4,464,019 | 8/1984 | Gagnon | |
| 4,733,926 | 3/1988 | Title | 359/352 |
| 4,827,334 | 5/1989 | Johnson et al. | |
| 5,237,435 | 8/1993 | Kurematsu et al. | |
| 5,357,370 | 10/1994 | Miyatake et al. | 359/496 |

FOREIGN PATENT DOCUMENTS

| | | | |
|---|---|---|---|
| 974318 | 3/1951 | Germany . | |
| 2260092 | 12/1972 | Germany | 359/352 |
| 61-14486 | 4/1986 | Japan . | |
| 61-14205 | 5/1986 | Japan | 359/352 |
| 63-4217 | 1/1988 | Japan . | |
| 3-186805 | 8/1991 | Japan | 359/352 |
| 3-226701 | 10/1991 | Japan | 359/352 |
| 4355702 | 12/1992 | Japan | 359/352 |
| 762678 | 12/1956 | United Kingdom | 359/488 |

OTHER PUBLICATIONS

Patent Abstracts of Japan, vol. 14, No. 94 (P–1010) 21 Feb. 1990 & JP-A-13 02 385 Published Jun. 12, 1989, English Abstract.
Patent Abstracts of Japan, vol. 10, No. 268 (E–436) 12 ept. 1986 & JP-A-61 090 584 Published Aug. 5, 1986 English Abstract.
Pfund, "Improved Infra-Red Polarizer," *Josa*, vol. 37, No. 7, Jul., 1947, pp. 558 to 559.
Gerritsen, "Infrared Polarizer," *RCA Technical Notes*, No. 608, Mar. 1965.
Bogomolov et al, "An Infrared Polarizer," *Instrum. Exp. Tech.* (USA), vol. 16, No. 3, p. 2, May–Jun. 1973.

*Primary Examiner*—Martin Lerner
*Attorney, Agent, or Firm*—Cushman, Darby & Cushman

[57] ABSTRACT

A polarizer comprising; a substrate transparent to a light of actual use and optical thin films of a higher refractive index than that of said substrate deposited on both surfaces of said substrate. The substrate is arranged so as to receive the incident light obliquely thereto. When the incident angle and the thickness of the optical thin film are optimally selected, the transmittance for the P polarized light can be made approximately 100%, while that for the S polarized light very small. The polarizer can extract a substantially linearly polarized light from natural light, A projection image display system has the polarizer as its pre-polarizer. The polarizer is also useful for infrared radiation.

18 Claims, 14 Drawing Sheets

[5,513,035]

INFRARED POLARIZER

This is a division of application Ser. No. 07/888,773, filed May 27, 1992 now U.S. Pat. No. 5,357,370.

FIELD OF THE INVENTION AND RELATED ART STATEMENT

1. Field of the Invention

The present invention generally relates to a polarizer and is concerned in particular with such a polarizer that emits a linearly polarized light or a substantially linearly polarized light upon an incidence of a substantial natural light. The present invention also relates to a projection image display system that comprises the polarizer.

2. Description of the Prior Art

It has hitherto been known such a projection display system that an optical image corresponding to a video signal and produced on a light valve is projected on a projection screen. In order to produce a large screen image, the optical image on the light valve is usually magnified by a projection lens. Recently, such a projection display system that utilizes a liquid-crystal display device as light valve has attracted a lot attention.

An example of the conventional image projection display system that utilizes the liquid-crystal display device is schematically illustrated in FIG. 13. In the system of FIG. 13, light emitted from a light source 1 is transmitted through a liquid-crystal display device 2 and is incident upon a projection lens 3. The liquid-crystal display device 2 comprises a liquid crystal cell 4, an incident side polarizing plate 5 and an output side polarizing plate 6. The liquid crystal cell 4 includes a pair of glass substrates 7 and 8 disposed parallel to one another and a layer 9 of twisted nematic liquid crystal sealed therebetween. On the surfaces of the glass substrates 7 and 8 facing the liquid crystal layer 9, there are provided transparent pixel electrodes, arranged in matrix. The polarization axis of the incident side polarizing plate 5 is arranged a right angle with that of the output side polarizing plate 6. In case where no voltage is applied across the transparent pixel electrodes, the transmittance of the liquid crystal device 2 is at its maximum because the linearly polarized light emitted from the incident side polarizing plate rotates by 90° in the liquid crystal cell 4 due to its optical rotatory power. When a voltage is applied across the transparent electrodes, the optical rotatory power decreases in response to the applied voltage, and the transmittance is reduced accordingly. In this manner, an optical image which corresponds to the video signal is produced in the liquid-crystal display device 2 as a variance in the transmittance, and this optical image is magnified by the projection lens 3 and projected on a screen 10.

In the conventional apparatus configured as shown in FIG. 13, the transmittance of the incident side polarizing plate 5 for natural light is about 40%; and most of the light component that is not transmitted is absorbed by the polarizing plate 5 and is converted into heat. When the temperature of the incident side polarizing plate 5 rises, that of the liquid crystal cell 4 also rises by radiation. In general, the polarizing plates 5 and 6 and the liquid crystal cell 4 have only limited heat resistance and lightfastness characteristics. And because of the deterioration in the polarization ability of the polarizing plates 5 and 6 and the deterioration in the picture quality of the optical image produced by the liquid crystal cell, which deteriorations are attributable to a very intensive light irradiation, it is difficult to maintain the high picture quality of projected image for a long service time.

In order to cope with this problem of elevating temperatures, generally the liquid crystal cell 4 and the polarizing plates 5 and 6 are cooled by a known (hence omitted in FIG. 13) cooling fan. But this measure produces another problem of noise attributable to the cooling fan. The quantity of light absorbed by the incident side polarizing plate 5 can be reduced, when only a linearly polarized light is led into the incident side polarizing plate 5. Thus Gagnon et al. proposes a method of arranging a polarizing beam splitter along the optical axis and close to the light source in the U.S. Pat. No. 4,464,018. Gagnon et al. also discloses in the U.S. Pat. No. 4,464,019, a polarizing beam splitter that utilizes a liquid in lieu of glass in order to overcome the very high manufacturing cost of the polarizing beam splitter comprising a glass prism. However, any of the conventional polarizing beam splitters occupies a large space, and thus it is difficult to make the whole system, including such beam splitter compact.

A countermeasure of disposing a pre-polarizer close to the light source is one that might be effective. Since the pre-polarizer need not have such a high polarization efficiency as needed for the incident side polarizing plate, Ono has disclosed in Japanese Unexamined Patent Publication (Tokkaisho) 63-4217, a method of employing, as its pre-polarizer, a dyestuff-type polarizing plate, which is advantageous in its heat resistance and lightfastness characteristics as compared with an iodine-type polarizing plate. Although the heat generation in the incident side polarizing plate can be suppressed by employing the pre-polarizer it is difficult to embody this concept in a practical system, because the temperature of the space surrounding the light source is such a high degree as to exceed the limit of the heat resistance and lightfastness abilities of the pre-polarizer. In any event, a new problem will arise when it is intended to overcome the limit imposed by the heat resistance and lightfastness abilities of the presently available incident side polarizing plate; and it has been difficult to obtain a bright projected image of high picture quality.

Further, Miyata et al. has disclosed in Japanese Examined Patent Publication (Tokko) 61-14486, a method of employing a polarizer for infrared radiation obtained by providing protective films of thorium tetrafluoride on both sides of a potassium chloride substrate and by arranging the polarizer at such an incident angle that the reflectance of P polarized light is managed to be close to 0%. In this method however, the employed polarizer has a low reflectance for the S polarized light, because the refractive index of the protective films is lower than that of the substrate. Thus the polarizer has an insufficient characteristics as the polarizer.

Moreover, Hansen et al. has disclosed in the U.S. Pat. No. 3,439,968 a polarizer obtained by arranging a germanium substrate in zig-zag configuration so that the light is made to be incident upon the polarizer at a Brewster's angle. The reflectance for the P polarized light which is incident upon the polarizer at the Brewster's angle, is 0%. But on the other hand, the reflectance for the S polarized light is not large.

Ashley et al. has disclosed in the U.S. Pat. No. 3,765,746 another structure. The Ashley et al. structure comprises a polarizer obtained by vapor deposition of thin films of germanium on both sides of a sodium chloride substrate, and the polarizers are arranged in X-shape in a manner that the incident angle on the polarizer is a Brewster's angle for the germanium thin film. According to this disclosure, the boundary surface between the reflectance of the coated polarizer for the S polarized light is higher than that having no thin films owing to the interference effect of the thin film having a higher refractive index than that of the substrate. However, since the light is incident upon the boundary surface between the optical thin film and the substrate at the angle different from the Brewster's angle, the reflectance of the P polarized light is not 0%. As a result, the transmittance for the P polarized light becomes insufficient.

OBJECTS AND SUMMARY OF THE INVENTION

It is therefore a primary object of the present invention to provide a polarizer of low manufacturing cost and compact size and capable of displaying a bright projected image of high picture quality for a long time by employing said polarizer as its component.

The present invention can provide a polarizer which can be employed for infrared radiation and has a low manufacturing cost.

The present invention provides a polarizer comprising; at least one polarization-selective mirror, each of which include; a glass substrate and optical thin films having a higher refractive index than that of the glass substrate and being deposited on both the surfaces of said substrate, obliquely arranged with respect to a given optical axis in a manner that a transmittance of the polarizer for P polarized light being incident upon the polarizer along said optical axis is to be its maximum value.

The above-defined polarizer preferably satisfies the following conditions:

$$\frac{n_1^2}{\cos^2 \theta_1} = \frac{n_0 n_2}{\cos \theta_0 \cos \theta_2}$$

$$d = \frac{\lambda}{4 n_1 \cos \theta_1},$$

where, $n_0$ represents the refractive index of the exterior medium; $n_1$ represents the refractive index of the optical thin film; $n_2$ represents the refractive index of the glass substrate; d represents the thickness of the optical thin film; $\theta_0$ represents an incident angle of the light enterring from the exterior medium into the optical thin film; $\theta_1$ represents a refraction angle of the light in said optical thin film; $\theta_2$ represents a refraction angle of the light in said glass substrate; and $\lambda$ represents the main wavelength of the light traveling through the air.

In the above-defined polarizer, the optical thin film preferably is any one of titanium dioxide, cerium dioxide or zinc sulfide. The refractive index of the optical thin film is preferably no smaller than 2.0. In the above-defined polarizer, the incident angle $\theta_0$ of light entering from the exterior medium into the optical thin film and the thickness d of said optical thin film preferably satisfy the following conditions in the spectral wavelength in the air of 400 nm–700 nm:

65.4°≦$\theta_0$≦74.9°

38.7 nm≦d≦73.0 nm.

The optical thin films are deposited simultaneously on both surfaces of the glass substrate by dipping method.

The polarizer may alternatively comprise: a plurality of a polarization-selective mirrors, each of which is configured as defined above, and is laminated one on the other sandwiching a thin air layer or a thin gap, and then arranged as defined above.

In this case, in addition to the above defined titanium dioxide, cerium dioxide or zinc sulfide, the optical thin film preferably is any one of ditantalum pentoxide, zirconium dioxide, diindium trioxide, zinc oxide, hafnium dioxide, diyttrium trioxide or silicon monoxide, and has a refractive index no smaller than 1.7.

The polarizer may further comprise; a framework for supporting a plurality of the above defined polarization-selective mirrors preferably of even number, in zig-zag fashion; and the supported polarization-selective mirrors are arranged as defined above.

According to another aspect of the present invention, there is provided a projection display system comprising:

a light source, a polarizer for extracting a substantially linearly polarized light from the light emitted from said light source, at least one light valve, each for producing an optical image in response to video signal therein, having a polarizing plate at least at its incident side, and a projection lens capable of magnifying the optical image produced in said light valve and projecting it onto a projection screen;

wherein said polarizer is one of the polarizer comprising; at least one polarization-selective mirror, each of which includes; a glass substrate and optical thin films having a higher refractive index than that of said glass substrate and being deposited on both the surfaces of said substrate, obliquely arranged with respect to a given optical axis in a manner that a transmittance of the polarizer for P polarized light being incident upon the polarizer along said optical axis is to be its maximum value; and said system is configured in a manner that the output light from said polarizer can travel through said incident side polarizer at its approximately maximum transmittance.

In the above-defined projection display system, said light valve may be a liquid-crystal display device, which comprises: a half wave plate disposed adjacent to its incident side polarizing plate. The direction of the polarization axis of said incident side polarizing plate is preferably selected to a specified angle (e.g. 45° or 0° or 90°) with respect to the vertical direction of the image. The polarizer is configured in a manner such that the plane containing both the normal of the glass substrate and the optical axis is parallel to the vertical direction or the horizontal direction of the image. The half wave plate is disposed in a manner such that the light emitted from said polarizer can travel through said incident side polarizing plate at its approximately maximum transmittance.

In the above-defined projection display system, the light source preferably is capable of emitting a light containing three primary color light components, and said system further comprise:

⊂a color separator capable of decomposing the output light emitted from said polarizer into three primary color light components, and⊃

⊂three light valves, each for producing an optical image in response to video signal therein, having a polarizer at least at its incident side.

Further, in the above-defined projection display systems, optical axes of lights passing through respective centers of pictures of the light valves preferably travel in the same plane, and that plane of polarization of linearly polarized light emitted from the polarization-selective mirror is preferably perpendicular to the above-mentioned same plane. Thereby, a clear projected image is obtainable by a decrease in undesirable refractions of light.

According to a further aspect of the present invention, there is provided a polarizer operable also for infrared radiation at least one polarization-selective mirror, each of which includes a substrate, made of a substance which is substantially transparent for infrared radiation, and optical thin films being deposited on both surfaces of said substrate, obliquely arranged with respect to a given optical axis in a manner that a transmittance of the polarizer for P polarized light incident upon the polarizer along said optical axis takes its maximum value.

In the above-defined polarizer, the substance for said substrate preferably is silicon and the substance for said optical thin films preferably is germanium. In addition the substance for the substrate preferably is one member selected from the group consisting of sodium chloride, potassium chloride, calcium difluoride and barium difluoride, while the substance for the optical thin films preferably is one member selected from the group consisting of silicon and germanium.

The above-defined polarizer preferably satisfies the following conditions:

$$\frac{n_1^2}{\cos^2 \theta_1} = \frac{n_0 n_2}{\cos \theta_0 \cos \theta_2}$$

$$d = \frac{\lambda}{4 n_1 \cos \theta_1},$$

where, $n_0$ represents the refractive index of the exterior medium; $n_1$ represents the refractive index of the optical thin film; $n_2$ represents the refractive index of the substrate; d represents the thickness of the optical thin film; $\theta_0$ represents an incident angle of light entering from the exterior medium into the optical thin film; $\theta_1$ represents a refraction angle of the light in said optical thin film; $\theta_2$ represents a refraction angle of the light in said substrate; and $\lambda$ represents the main wavelength of the infrared radiation traveling through the air.

In the above-defined polarizer, said polarization-selective mirrors preferably is laminated one on the other, sandwiching a thin air layer or a thin gap therebetween.

The above-defined polarizer may further comprise a framework for supporting the plurality of polarization-selective mirrors in zig-zag fashion.

In the above-defined polarizer, even numbers of the polarization-selective mirrors preferably are included therein.

By depositing the optical thin films on both the surfaces of the substrate, the polarizer of the present invention has succeeded in improving its overall transmittance for the S polarized light, much lower than the transmittance for the S polarized light for each of the either surface of the polarizer. The thus configured polarizer including at least one polarization-selective mirror can extract light, which is close to a linearly polarized light, from natural light. When this polarizer is employed in embodying a projection image display system including polarizing plates, the reliability of the incident side polarizing plate can be improved because the absorption quantity of light by the incident side polarizing plate can be reduced.

While the novel features of the present invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
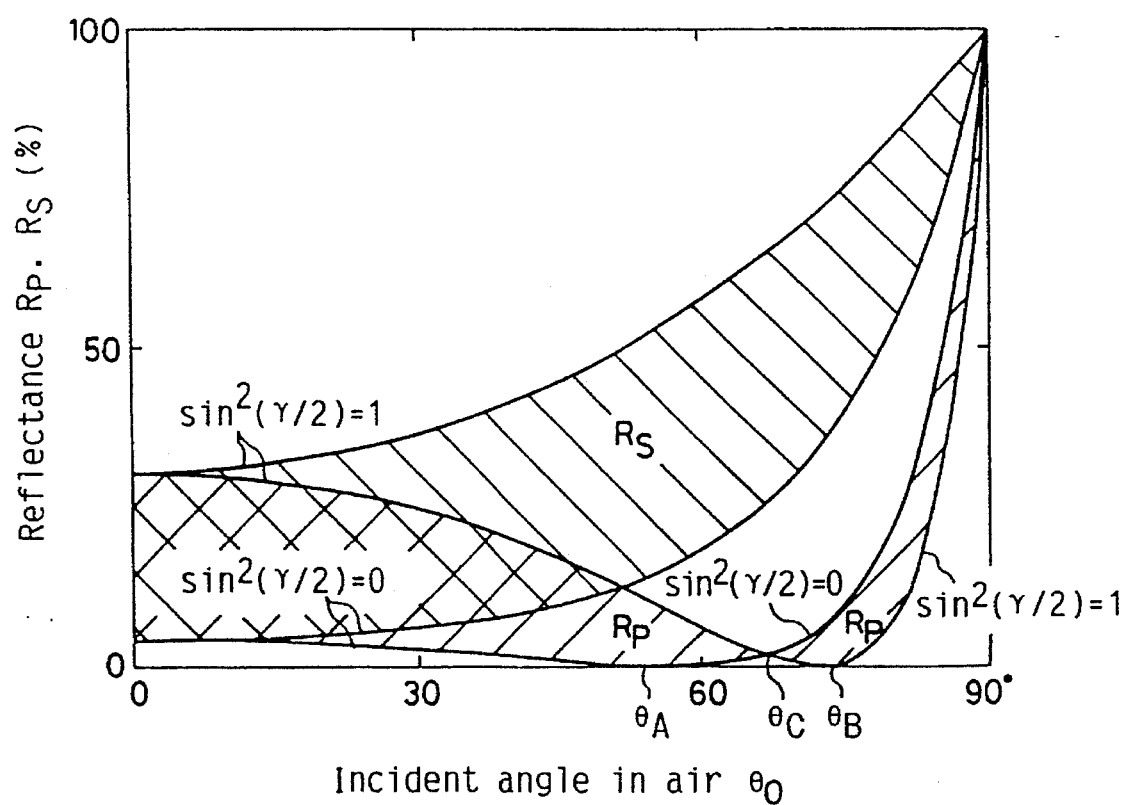
FIG. 1 is a graph representing the reflectance versus the incident angle characteristics of the polarization-selective mirror built in accordance with the present invention.

First, the principle of the present invention will be described in the following several paragraphs.

In cases where a polarized light is obliquely incident from air upon a glass substrate through an optical thin film. It is easy, for understanding its reflectance to consider both reflectance, $R_S$ for S polarized light and reflectance $R_P$ for P polarized light. The definition of S polarized light and P polarized light is light whose vibrations are perpendicular and parallel to the plane of incidence, respectively. And they can be represented by the following equations:

$$R_S = \frac{r_{S1}^2 + r_{S2}^2 + 2 r_{S1} r_{S2} \cos\gamma}{1 + r_{S1}^2 r_{S2}^2 + 2 r_{S1} r_{S2} \cos\gamma} \tag{1}$$

$$R_P = \frac{r_{P1}^2 + r_{P2}^2 + 2 r_{P1} r_{P2} \cos\gamma}{1 + r_{P1}^2 r_{P2}^2 + 2 r_{P1} r_{P2} \cos\gamma} \tag{2}$$

$$r_{S1} = \frac{n_0 \cos \theta_0 - n_1 \cos \theta_1}{n_0 \cos \theta_0 + n_1 \cos \theta_1} \tag{3}$$

$$r_{S2} = \frac{n_1 \cos \theta_1 - n_2 \cos \theta_2}{n_1 \cos \theta_1 + n_2 \cos \theta_2} \tag{4}$$

$$r_{P1} = \frac{n_0 / \cos \theta_0 - n_1 / \cos \theta_1}{n_0 / \cos \theta_0 + n_1 / \cos \theta_1} \tag{5}$$

-continued $$r_{P2} = \frac{n_1/\cos\theta_1 - n_2/\cos\theta_2}{n_1/\cos\theta_1 + n_2/\cos\theta_2} \quad (6)$$

$$\gamma = \frac{4\pi n_1 d \cos\theta_1}{\lambda} \quad (7)$$

In the above-mentioned equations, $r_{S1}$, $r_{S2}$, $r_{P1}$ and $r_{P2}$ are reflection coefficients of the boundary surfaces formed between the optical thin films and the substrate, wherein a mark with the suffix S represents that it is for the S polarized light, that with the suffix P represents that it is for the P polarized light, that with the suffix 1 represents that it is for the boundary surface between the exterior medium and the optical thin film, and that with the suffix 2 represents that it is for the boundary surface between the optical thin film and the glass substrate, respectively. Further, d represents the film thickness of the optical thin film and $\lambda$ represents the main wavelength of the light traveling through the air. In addition $n_0$ represents the refractive index of the exterior medium, $n_1$ represents the refractive index of the optical thin film and $n_2$ represents the refractive index of the glass substrate. And, $\theta_0$ represents an angle at which the light is incident from the exterior medium upon the optical thin film, $\theta_1$ represents an angle of refraction of the light in the optical thin film, and $\theta_2$ represents an angle of refraction of the light in the glass substrate.

The incident angle $\theta_0$ and angles of refraction $\theta_1$ and $\theta_2$ are the angle of incident light and angle of refracted light measured from the normal to the surfaces.

Among the above-stated refractive indices and angles of refraction, the following relationship holds based on Snell's law:

$$n_0 \sin\theta_0 = n_1 \sin\theta_1 = n_2 \sin\theta_s \quad (8)$$

Based on the foregoing equations, it is appreciated that $R_S$ and $R_P$ are the functions of $\sin^2(\gamma/2)$ when the incident angle $\theta_0$ is given and will take different values depending upon the film thickness d and the wavelength $\lambda$. Provided that the exterior medium is air ($n_0=1$) and that $n_1 > n_2$, $R_S$ and $R_P$ exist in the area between the two curves (Hatched area), respectively as shown in FIG. 1. Out of the two sets of curves, the one set represents the case of $\sin^2(\gamma/2)=1$, while the other set represents the case of $\sin^2(\gamma/2)=0$. The latter set curves equal to the reflectance at the surface of the substrate having no optical thin film.

The two curves of $R_P$ become 0% at incident angles $\theta_A$ and $\theta_B$, respectively, and cross each other at an incident angle $\theta_C$. From FIG. 1, it is appreciated that an incident angle $\theta_0$ which makes $R_P$ minimum resides between $\theta_A$ and $\theta_B$ when the thickness of the optical thin film is given, and that in the range of $\theta_A \leq \theta_0 \leq \theta_B$ the reflectance $R_S$ becomes considerably high as compared with $R_P$. Since the transmittance of a surface of transparent substance is obtained by subtracting the reflectance of the surface of that from 100%, an incident angle $\theta_0$ for resulting a maximum transmittance for the P polarized light resides between $\theta_A$ and $\theta_B$, and when: $\theta_A \leq \theta_0 \leq \theta_B$, the transmittance for the P polarized light becomes nearly 100% whereas the transmittance for the S polarized light becomes considerably smaller than 100%. Further, in order to obtain a high value of the reflectance $R_S$, it is desirable to select the incident angle $\theta_0$ in a manner to hold the relation $\theta_C \leq \theta_0 \leq \theta_B$ rather than the relation $\theta_A \leq \theta_0 \leq \theta_C$.

From FIG. 1, it is appreciated that, when the incident angle $\theta_0$ equals $\theta_B$ and $\sin^2(\gamma/2)=1$, $R_P$ becomes 0% while $R_S$ takes a very high value. For the same condition, the following two equations are derived from the formulae (2), (5), (6) and (7):

$$\frac{n_1^2}{\cos^2\theta_1} = \frac{n_0 n_2}{\cos\theta_0 \cos\theta_2} \quad (9)$$

$$d = \frac{\lambda}{4 n_1 \cos\theta_1} \quad (10)$$

Based on the foregoing equations (8) and (9), the incident angle $\theta_0$ from the air is represented by:

$$\sin\theta_0 = \frac{n_1}{n_0} \left\{ \frac{n_1^6(n_0^2 + n_2^2) - n_1^2 A^{1/2} - 2n_0^4 n_2^4}{2(n_1^2 - n_0^4 n_2^4)} \right\}^{1/2} \quad (11)$$

$$A = n_1^2(n_0^2 - n_2^2)^2 + 4n_0^4 n_2^4 (n_1^2 - n_0^2)(n_1^2 - n_2^2). \quad (12)$$

The phenomenon that $R_P$ becomes 0% resembles the phenomenon that $R_P$ becomes 0% at an especial incident angle of light entering a boundary surface between two media of each-other-different refractive index. The incident angle or the angle of refraction in this case is called as Brewster's angle in general. Throughout this specification, $\theta_0$ in the equations (9) and (11) is to be referred to as quasi-Brewster's angle so as to discriminate it from the general Brewster's angle. By utilizing the equation (1), the $R_S$ in the case that the conditions represented by the equation (9) and (11) is satisfied is represented by the following equation:

$$Rs = \left( \frac{n_0^2 n_2^2 - n_1^4}{n_0^2 n_2^2 + n_1^4} \right)^2 \quad (13)$$

When the same optical thin films are provided on both surfaces of the glass substrate, the transmittance of the S polarized light can be reduced compared with that of the boundary surface formed between the optical thin film and the glass substrate.

When the equations (13) is rearranged by substituting $n_0=1$, it is appreciated that the larger the value $n_1$ is, as compared with $n_2$, the larger the value $R_S$ becomes. In other words, in order to obtain a large $R_S$, it is desirable to select an optical thin film having a refractive index as high as possible as compared with that of a glass substrate.

On the other hand, when $n_1$ is selected to be high enough for lowering the transmittance for S polarized light, the incident angle $\theta_0$ from the air becomes large. Then, if the polarizer is configured only with a single polarization-selective mirror, the thickness of the polarizer along the optical axis becomes extremely large. Accordingly, the polarizer of the present invention is configured by arranging a plurality of the polarization-selective mirrors in a zig-zag fashion in order to decrease the overall thickness along the optical axis. As a result, the projection display system employing this polarizer can be configured compactly.

In addition, as clearly appreciated from FIG. 1, when the incident angle $\theta_0$ varies in the vicinity of $\theta_B$, $R_S$ varies considerably. Hereupon, the polarizer comprising a plurality of polarization-selective mirrors arranged in the zig-zag fashion, the light incident obliquely upon the polarizer is divided into two components, one being $\theta_0 > \theta_B$ and the other being $\theta_0 < \theta_B$, and the substantial $R_S$ becomes an average of the both. Thus, the polarizer of the present invention has a small dependency on the incident angle, and hence is advantageous in securing the uniformity of the brightness in the projected image.

As above-mentioned, the polarizer built in accordance with the present invention has a low manufacturing cost and small thickness. Furthermore, the projection display system employing the polarizer of the present invention is advantageous in high picture quality of the projected image for a long service time and in its compactness of the whole system.

EXAMPLE

Figure 2:
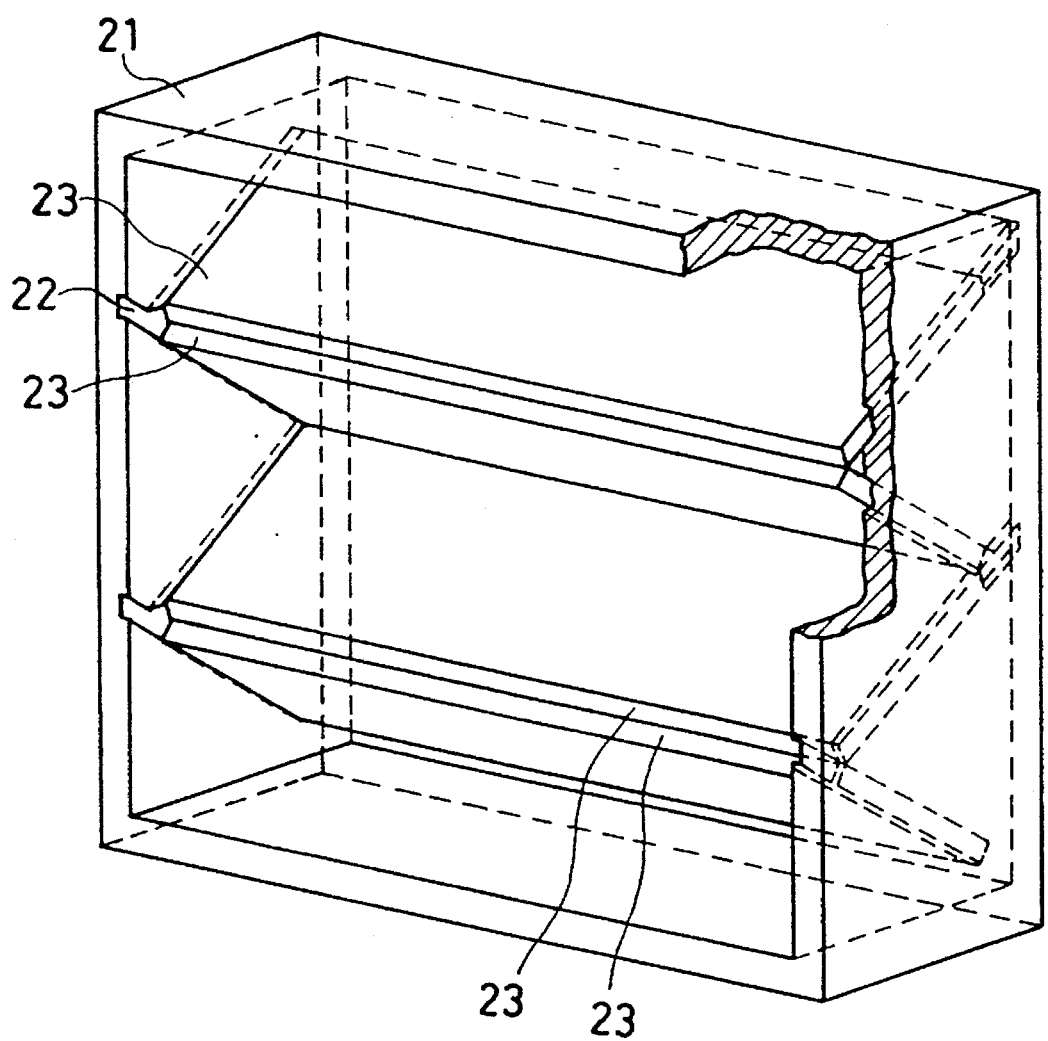
FIG. 2 is a partly cut-out perspective view showing one embodiment of the polarizer built in accordance with the present invention.

FIG. 2 is a partly cut-out schematic perspective view showing a structure of an embodiment of the polarization-selective mirror, which is the essential component of the polarizer built in accordance with the present invention. In FIG. 2, zig-zag grooves 22 are provided inside a framework 21, and a plurality of the polarization-selective mirrors 23 are supported by the framework 21 by engaging their ends with the grooves 22 in a manner that the side view of the mirrors 23 is arranged to be a zig-zag fashion.

Figure 3:
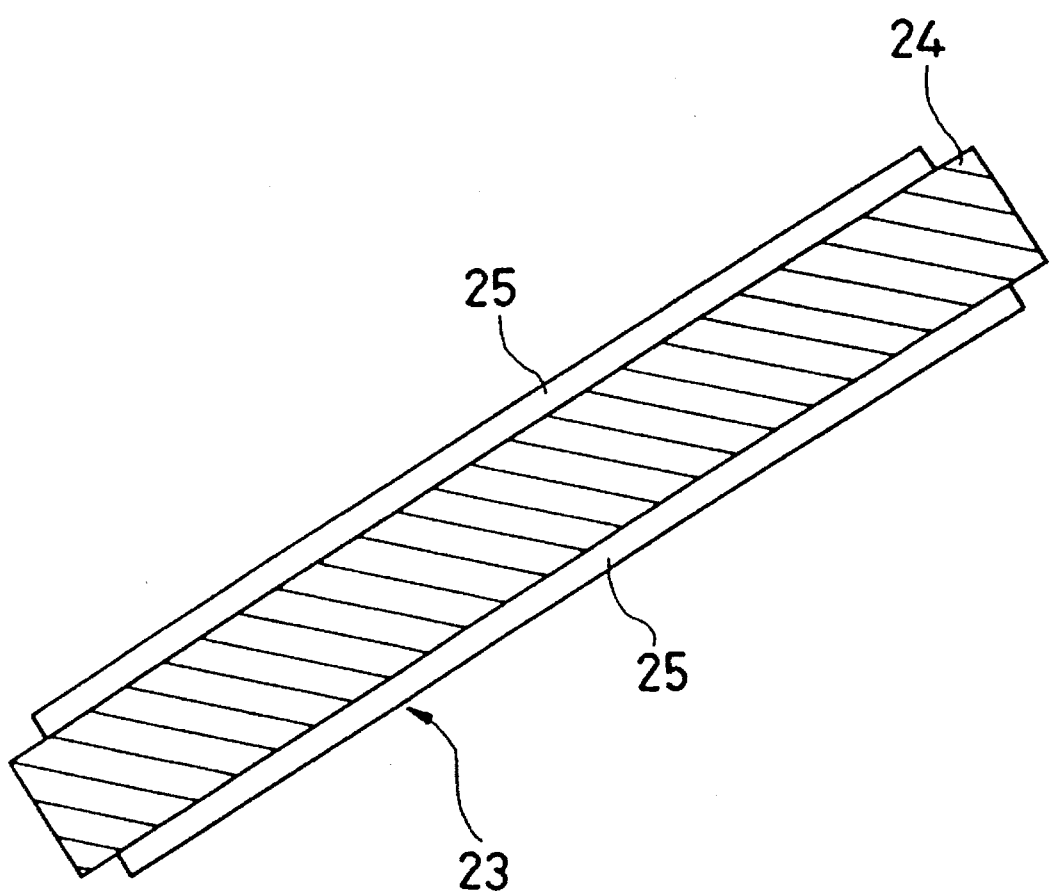
FIG. 3 is a schematic view showing the structure of the polarization-selective mirror.

FIG. 3 is a schematic view showing a structure of each of the polarization-selective mirrors 23. On both surfaces of a glass substrate 24, optical thin films 25 are provided. The glass substrate 24 is a sheet of float glass of the thickness: 1.1 mm. It is desirable to employ one substance having a low absorption and a high refractive index as the optical thin films 25. The table 1 below shows the substances together with their refractive indices available for the optical thin films 25 for visible light. It is preferable to employ one member selected from the group consisting of titanium dioxide, cerium dioxide and zinc sulfide having the highest refractive index of 2.3 as the optical thin films 25.

TABLE 1

| Substance | Refractive index |
| --- | --- |
| Titanium dioxide ($TiO_2$) | 2.3 |
| Cerium dioxide ($CeO_2$) | 2.3 |
| Zinc sulfide (ZnS) | 2.3 |
| Ditantalum pentoxide ($Ta_2O_5$) | 2.1 |
| Zinc oxide (ZnO) | 2.1 |
| Hafnium dioxide ($HfO_2$) | 2.1 |
| Zirconium dioxide ($ZrO_2$) | 2.0 |
| Diindium trioxide ($In_2O_3$) | 2.0 |

It is further preferable to arrange the polarization-selective mirror 23 in a manner that the incident angle $\theta_0$ of the light entering from the air to the mirror 23 satisfies the equations (8) and (9) and that the thickness d of the optical thin films 25 satisfies equation (10) in the main wavelength of the light. When air is selected as the exterior medium, titanium dioxide is selected as the substance for the optical thin films 25, and float glass is selected as the material for the glass substrate 24, it will be derived that: $n_0=1$, $n_1=2.3$, $n_2=1.52$, $\theta_0=72.2°$ and $\theta_1=23.5°$. When the main wavelength is selected as $\lambda=500$ nm, it will be derived that: d=59.7 nm, as summarized in Table 2. At this time, $R_S=0.718$ as derived from equation (13).

TABLE 2

| | $\theta_0 = 72.2°, \lambda = 500$ nm, | | |
| --- | --- | --- | --- |
| Components | Substance | Refractive index | Film thickness (nm) |
| | Air | 1.0 | — |
| Optical thin film. | Titanium dioxide | 2.3 | 59.7 nm |
| Substrate | Float glass | 1.52 | — |
| Optical thin film | Titanium dioxide | 2.3 | 59.7 nm |

TABLE 2-continued

| | $\theta_0 = 72.2°, \lambda = 500$ nm, | | |
| --- | --- | --- | --- |
| Components | Substance | Refractive index | Film thickness (nm) |
| | Air | 1.0 | — |

Figure 4:
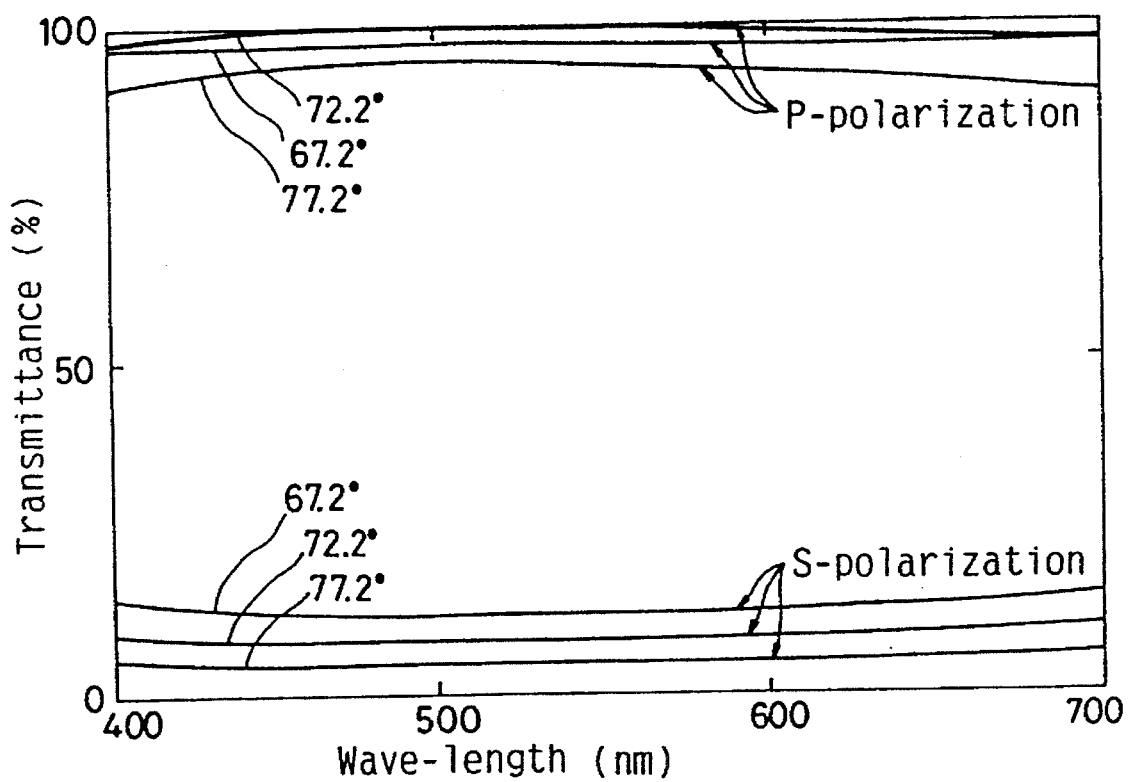
FIG. 4 is a graph showing a spectral transmittance of the polarizer built in accordance with the present invention.

FIG. 4 is a graph showing the spectral transmittance characteristics of the polarization-selective mirror 23 configured as summarized in Table 2, in the case where a parallel light beam is incident upon the mirror 23. Numerals in the graph represent the incident angles of the light beam entering from the air into the optical thin film 25. In case where the incident angle $\theta_0$ is 72.2°, i.e., the quasi-Brewster's angle, the transmittance for the P polarized light in the spectral wavelength in the air of 400–700 nm is no smaller than 95% while the S polarized light is no more than 10%. Since the polarized light must travel through two optical thin films of the same composition, the overall transmittance for the S polarized light has a very small value. In such a case where the incident angle from the air deviates from the optimum incident angle by ±5°, the transmittance for the P polarized light is lowered without fail whereas the transmittance for the S polarized light becomes smaller as the incident angle becomes larger. Since the polarizer of the present invention has the zig-zag arranged polarization-selective mirrors, the substantial transmittance for the S polarized light may well be considered to be about 10%, which is an average value of the transmittances for the S polarized light at the incident angles within ±5°. In order to secure the uniformity in the light intensity distribution of the light emitted from the polarizer, it is preferable to select pieces of even number of the polarization-selective mirrors 23. Otherwise, the dependency on the incident angle would become non-symmetrical in case of oblique light incidence upon the polarizer. And the effect of this non-symmetricality would likely to appear on the projected image. Based on FIG. 4, it is appreciated that the polarizer shown by FIG. 2 can effectively produce a light almost similar to the linearly-polarized light in case where a converging or diverging natural light is incident upon the polarizer. Strictly speaking, the produced light comprises the dominant linearly polarized light and the slight natural light.

The present inventors have confirmed based on various experiment that when the transmittance of the polarizer for the S polarized light is no larger than about 20%, the effect of suppressing the temperature rise in the incident side polarizing plate of the polarizer can sufficiently be appreciated. In order to decrease the transmittance of the polarization-selective mirror for the S polarized light to lower value than about 20%, $R_S \geq 0.55$ is sufficient; and when it is taken that $n_0=1$ and $n_2=1.52$, a condition of $n_{1 \geq 2.0}$ is obtained from the formula (13). As above-mentioned, it is appreciated that when either one of titanium dioxide, cerium dioxide, zinc sulfide, ditantalum pentoxide, zirconium dioxide, diindium trioxide, zinc oxide or hafnium dioxide is employed as the material for the optical thin film, both the optical characteristics and durability of the mirror are preferable.

The relations between the incident angle $\theta_0$ and the film thickness d shown in Table 2 are those for the optimum conditions which will satisfy the equations (9) and (10). Apart from these relations, when the transmittance of the polarization-selective mirror for the P polarized light becomes above 95% and the transmittance of that for the S polarized light becomes no more than 20% in the wavelength region of 400 nm–700 nm, the temperature rise of the incident side polarizing plate is suppressed satisfactorily, without decreasing hardly the amount of the light passing therethrough. In such case the condition of $$R_s \geq 0.55$$

and $$R_p \leq 0.025$$

is enough, whereby the incident angle $\theta_0$ and the film thickness d can be selected in the region shown in Table 3.

TABLE 3

| Incident angle $\theta_0$ (°) | Film thickness d (nm) |
| --- | --- |
| 65.4 | 49.6 - 62.1 |
| 66.0 | 47.9 - 67.3 |
| 67.0 | 45.7 - 68.6 |
| 68.0 | 43.1 - 70.4 |
| 69.0 | 40.9 - 71.7 |
| 70.0 | 38.7 - 73.0 |
| 71.0 | 43.5 - 70.4 |
| 72.0 | 47.9 - 67.8 |
| 73.0 | 52.2 - 65.6 |
| 74.0 | 56.6 - 63.4 |
| 74.9 | 60.9 |

Therefore, in this case, the usable incident angle $\theta_0$ in the air is as follows:

$$65.4° \leq \theta_0 \leq 74.9° \quad (14)$$

and the condition for the film thickness d for this case is as follows:

$$38.7 \text{ nm} \leq d \leq 73.0 \text{ nm}. \quad (15)$$

EXAMPLE 2—(POLARIZER 2)

Figure 5:
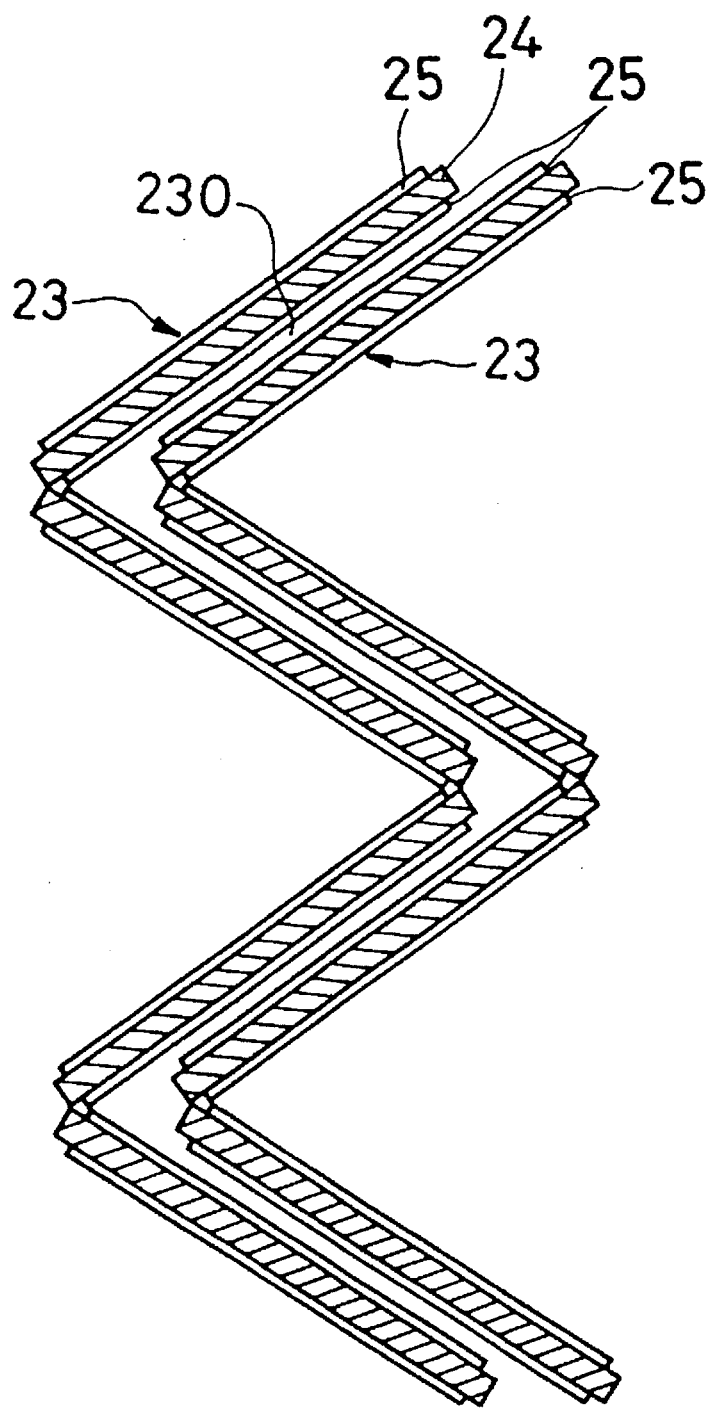
FIG. 5 is a schematic view showing the structure of another embodiment of the polarizer built in accordance with the present invention.

In addition to the example 1, the transmittance of the polarization-selective mirror 23 for the S polarized light can further be lowered by configuring the mirror so as to comprise a pair of mirrors 23, 23 which are arranged in parallel to each other and sandwiching a thin air layer or a thin gap 230 therebetween as shown by the schematic view of FIG. 5. In order to make the transmittance of the polarizer for the S polarized light smaller than the value of about 20%, a condition: $R_s \leq 0.33$ is sufficient. And when it is taken that $n_0 = 1$ and $n_2 = 1.52$, a condition: $n_1 \geq 1.7$ is obtained from the formula (13) for this case. As above-mentioned, it is appreciated that when either one of titanium dioxide, cerium dioxide, zinc sulfide, ditantalum pentoxide, zirconium dioxide, diindium trioxide, zinc oxide, hafnium dioxide, diyttrium trioxide or silicon monoxide is employed as the material for the optical thin film, both the optical characteristics and durability of the mirror are satisfactory. The larger the number of the laminated polarization-selective mirrors is, the smaller the transmittance for the S polarized light becomes.

It is preferable to employ either one of a vacuum vapor deposition or a dipping method in depositing the optical thin films 25 on both surfaces of the glass substrate 24. By depositing the thin film of titanium dioxide in the dipping method, the polarization-selective mirror can be manufactured at low cost, because the dipping method is easier in operation than the vacuum vapor deposition and capable of simultaneously forming the thin films of the same film thickness on both surfaces of the glass substrate. On such a condition that tetrabutyl titanate is used as a metal compound for forming the titanium dioxide film, and the baking temperature after the dipping is selected to be 400°–500° C., a transparent titanium dioxide thin film having a refractive index close to 2.3 can be obtained.

EXAMPLE 3—(PROJECTION DISPLAY SYSTEM 1)

Figure 6:
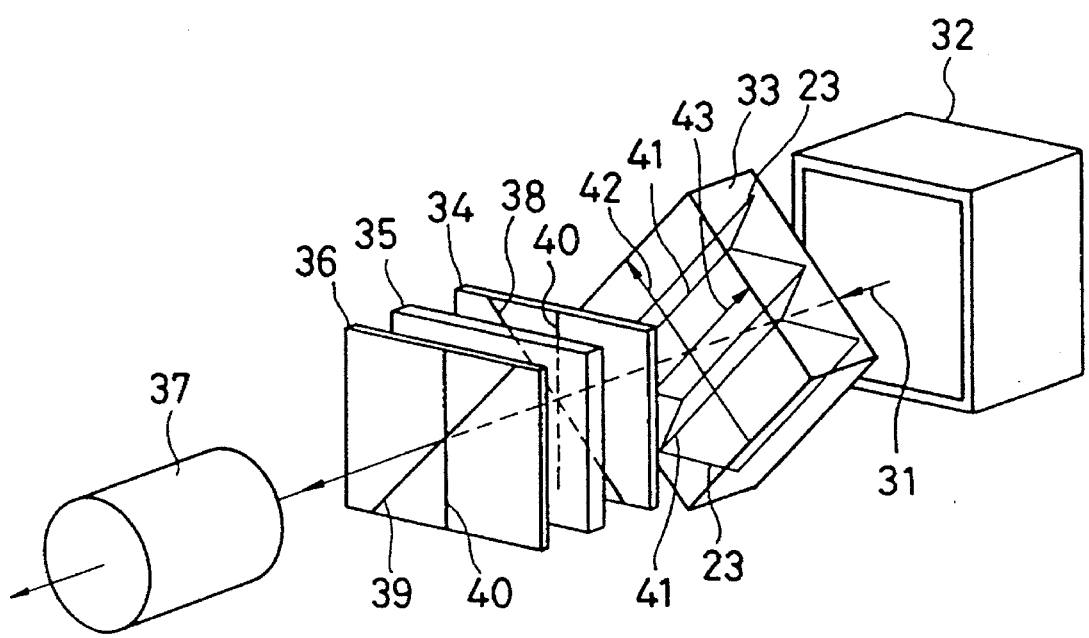
FIG. 6 is a perspective view showing one embodiment of the projection display system built in accordance with the present invention.

FIG. 6 is a schematic perspective view showing an embodiment of the projection display system which comprises the polarizer in accordance with the present invention as its pre-polarizer. The pre-polarizer 33 is the same as that shown in FIG. 2. A light source 32 comprises a lamp to emit a light and a concave mirror for condensing the light. The light travels through the pre-polarizer 33, the incident side polarizing plate 34, the liquid crystal cell 35 and the output side polarizing plate 36, and then is incident upon the projection lens 37. The polarization axis 38 of the incident side polarizing plate 34 and the polarization axis 39 of the output side polarizing plate 36 are selected to be oriented by +45° and –45° with respect to the vertical direction of the Image, respectively. The pre-polarizer 33 is disposed apart from the incident side polarizing plate 34 in a manner that each of the joining edges 41 of the adjacent polarization-selective mirrors 23 is selected to be vertical to the polarization axis 38 of the incident side polarizing plate 34.

Figure 6A:
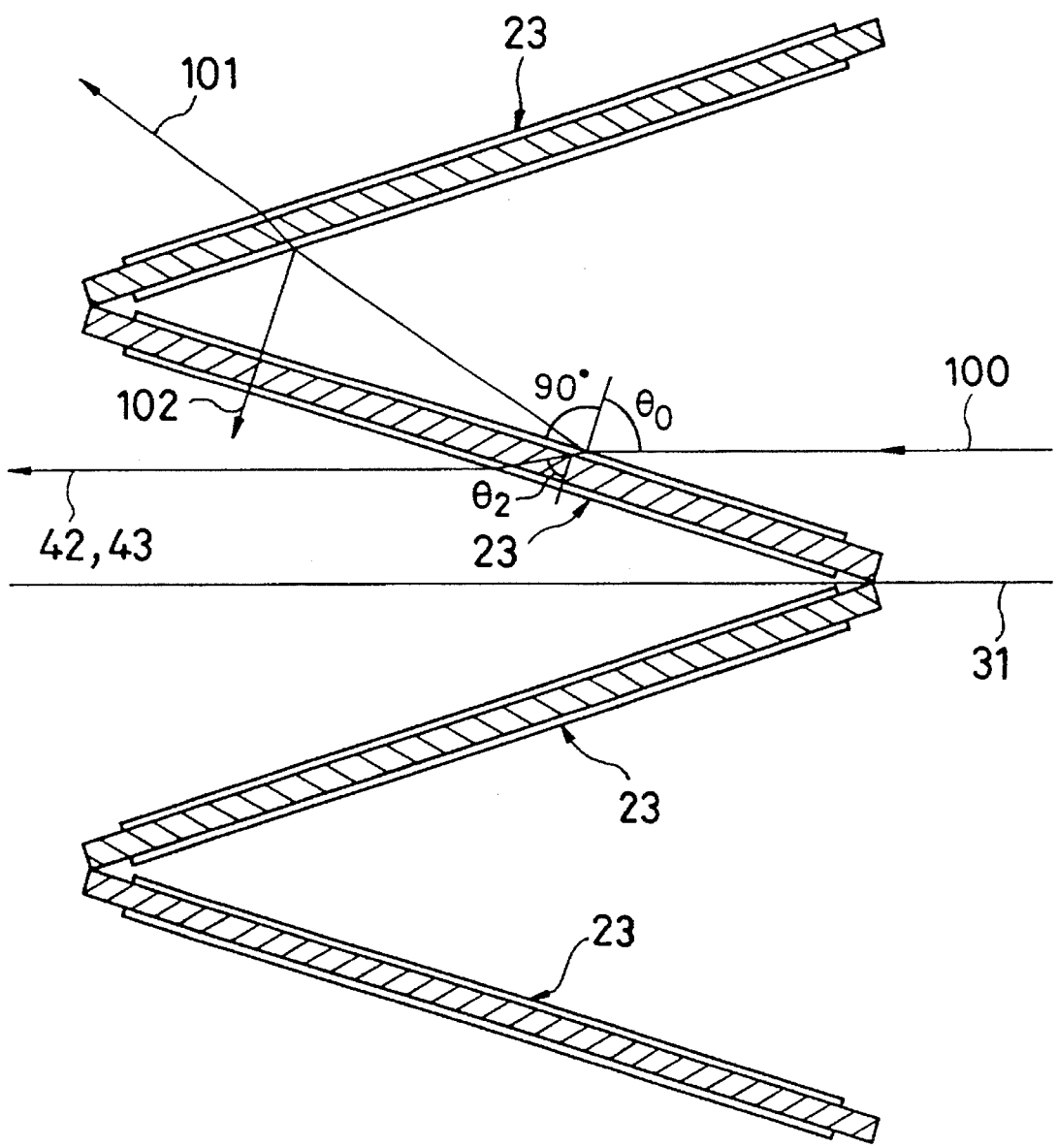
FIG. 6A is a schematic view showing operation of the pre-polarizer which is used in the embodiment in FIG. 6.

When a natural light 100 from the light source 32 is incident upon the pre-polarizer 33 along the optical axis 31, it emits a strong P polarized light 42 and a weak S polarized light 43 light along optical axis 31, and emits a strong S polarized light in the oblique direction 101 and 102 as shown in FIG. 6A. The strong S polarized light 101 and 102 does not reach the incident side polarizing plate 34, because the incident side polarizing plate 34 is disposed apart from the pre-polarizer 33. The P polarized light 42 travels through the incident side polarizing plate 34 at its maximum transmittance, and the weak S polarized light 43 is absorbed by the incident side polarizing plate 34. In this case, the light absorption quantity by the incident side polarizing plate 34 is reduced by a great deal, and the amount of the heat generated therein is also reduced. Thus the temperature rise in the incident side polarizing plate 34 is controlled to be small. Further, the temperature rise in the liquid crystal cell 35 Is also suppressed. As a result, the reliability of the incident side polarizing plate 34 and the liquid crystal cell 35 is much improved.

The polarizer unit built in accordance with the present invention can be configured to have small thickness along the light axis, because it has the polarization-selective mirrors 23 disposed in the zig-zag fashion. As a result, only little restriction is imposed in designing the whole projection display system to incorporate the polarizer unit. For instance, both of a plane mirror and the pre-polarizer 33 can be disposed between the light source 32 and the liquid crystal cell 35, and thus a compact projection display system can be designed by the use of the plane mirror.

If multi-layer film surfaces of a glass polarizing beam splitter were to be made in zig-zag shape, a great rise in its manufacturing cost would be introduced in general. This is because the complexity in the machining of the glass prisms as well as their joining process are necessary. In the polarizer unit built in accordance with the present invention however, its glass substrates of overwhelmingly low cost as compared with the conventionally used glass prisms are used. And thus, the polarizer unit can be manufactured at a very much low cost as compared with the conventional polarizing beam splitter.

As the lamp of the projection display system, use of any halogen lamp, such as a xenon lamp and metal halide lamp may be considered. But the above-stated conventional polarizing beam splitter can not be disposed in the vicinity of the light source, because of its disadvantage in that the adhesive agent used in joining the prisms would decolor at a high temperature. Contrary to this, the polarizer unit built in accordance with the present invention can be disposed safely in a space adjacent to the light source, because the heat resistance characteristics of the glass substrate as well as of the optical thin film are satisfactory for such a design.

In the case of employing the liquid-crystal display device as a light valve, it is the general practice to arrange the incident side polarizing plate 34 and of the output side polarizing plate 36 in a manner that their polarization axes 38 and 39 are oriented at either one of +45° or −45° with respect to vertical direction of the image 40 as shown by FIG. 6, in order to make the picture quality of the projected image bisymmetrical. In such case, the light emitted from the pre-polarizer 33 is required to travel efficiently through the incident side polarizing plate 34, and hence the pre-polarizer 33 must be obliquely arranged whereby each of the side faces of the framework 21 are disposed slanted by 45° from the vertical direction of the image 40.

EXAMPLE 4—(PROJECTION DISPLAY SYSTEM 2)

Figure 7:
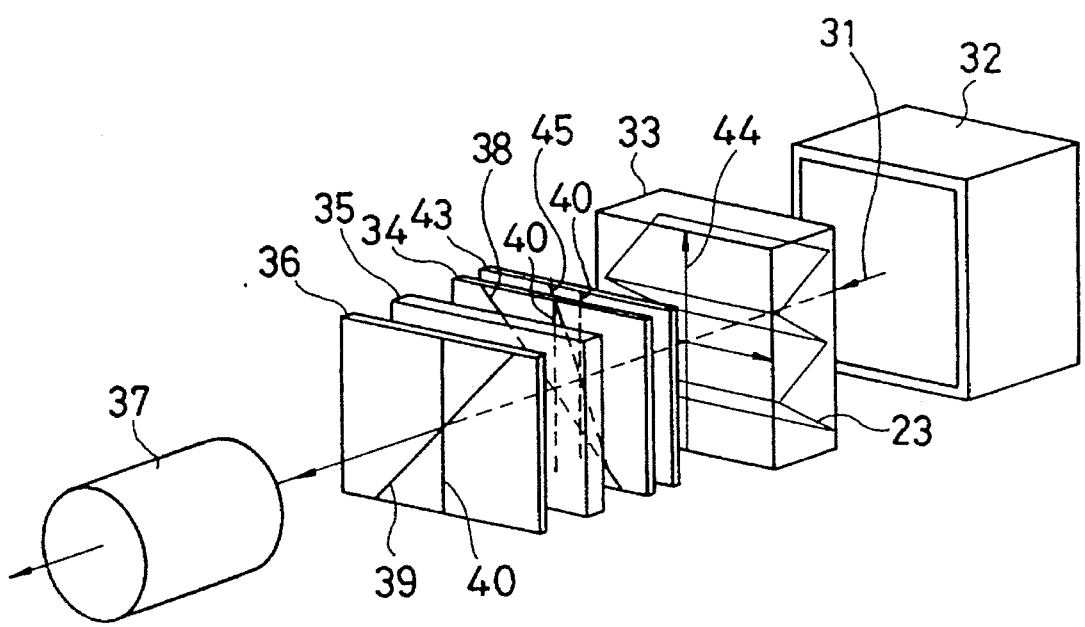
FIG. 7 is a perspective view showing another embodiment of the projection display system built in accordance with the present invention.

The arrangement as shown in FIG. 6 is however difficult and inconvenient for the compact design of the overall system. Thus, in order to configure the whole system compact, it is desirable for the respective side faces of the framework 21 of the pre-polarizer 33 to orient along the vertical and horizontal directions of the image. For this purpose, it is preferable to dispose a half wave plate 430 between the pre-polarizer 33 and the incident side polarizing plate 34 and adjacent to the latter as shown in FIG. 7. The linearly polarized light 44 is emitted from the pre-polarizer 33 orienting its polarization direction to the vertical direction of the image 40, and the half wave plate 430 is arranged in a manner that its fast optic axis 45 is oriented by 22.5° with respect to the vertical direction of the image 40. When the linearly polarized light 44 from the pre-polarizer 33 is incident upon the half wave plate 430, a linearly polarized light is emitted with the plane of polarization oriented by 45° with respect to the vertical direction of the image. And this linearly polarized light travels through the incident side polarizing plate 34. It is recommended that the half wave plate 430 be disposed in a manner that the direction of its fast optic axis or its slow optic axis orients to a direction of a line in a manner that the line equally halves an angle formed between the direction of the P polarized light 44 emitted from the pre-polarizer 33 and the direction of the polarization axis 38 of the incident side polarizing plate 34. The half wave plate 430 is such a device that, when one and the other linearly polarized lights, which are each-other in the same phase and are oriented to its fast optic axis and its slow optic axis respectively, are incident upon the plate simultaneously, both the resultant lights at the output side differs in phase by a half wavelength. In the configuration of the system shown in FIG. 7, it is impossible to make the phase difference a half wavelength throughout the whole wavelength, because of the wide spectrum of the light emitted from the light source 32. It however can safely be ignored as far as the practical system is designed in a manner that the phase difference at the green light spectrum region having a high spectral luminous efficiency is to be made one half wavelength.

EXAMPLE 5—(PROJECTION DISPLAY SYSTEM 3)

Figure 8:
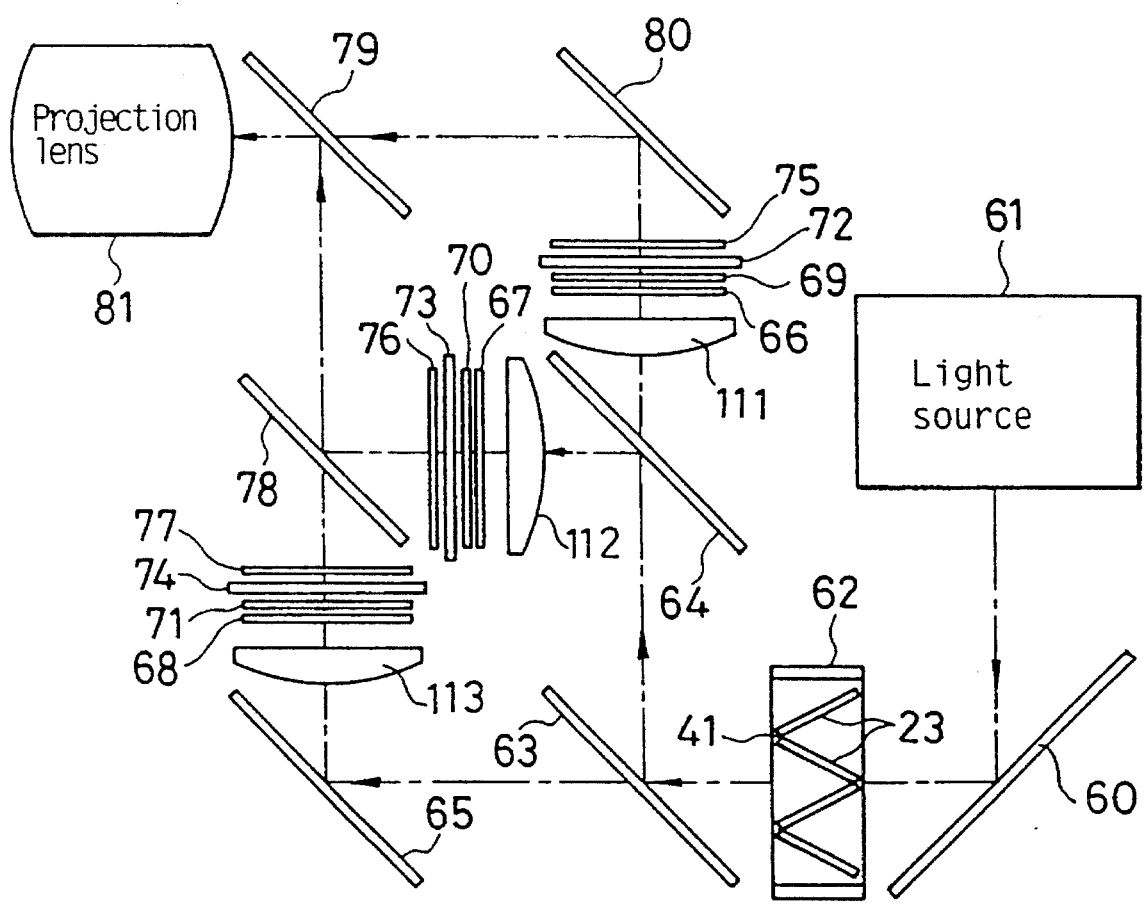
FIG. 8 is a schematic view showing a further embodiment of the projection display system built in accordance with the present invention.

FIG. 8 is a schematic side view showing a structure of another embodiment of the projection display system built in accordance with the present invention. In this embodiment, the pre-polarizer unit 62 is the same as that shown in FIG. 2, and the light source 61 emits the light containing components of the three primary color lights of red, green and blue. When the light emitted from the light source 61 is via a mirror 60 incident upon the pre-polarizer 62, it emits the linearly polarized light whose plane of polarization is oriented to the vertical direction of the image. The linearly polarized light is incident upon a color separator comprising two dichroic mirrors 63 and 64, and a plane mirror 65 and is decomposed into three primary color lights. Each of the primary color lights travels through one of the field lenses 111, 112 and 113, one of the half wave plates 66, 67 and 68, one of the incident side polarizing plates 69, 70 and 71, one of the liquid crystal cells 72, 73 and 74, and one of the output side polarizing plates 75, 76 and 77, respectively. Each of the lights emitted from the output side polarizing plates 75, 76 and 77 is synthesized into a light by a color combiner comprising two dichroic mirrors 78 and 79, and a plane mirror 80 and then is incident upon the projection lens 81. In this case also, the optical system contains, in its light paths, the half wave plates 66, 67 and 68, in order to cause the lights to travel through the incident side polarizing plates 69, 70 and 71 at their maximum transmittance. The pre-polarizer 62 emits a light which is close to the linearly polarized light to reduce the absorption of the light at the incident side polarizing plates 69, 70 and 71, and accordingly the heat generation by the incident side polarizing plates 69, 70 and 71 is effectively suppressed. Further, since the pre-polarizer unit 62 can safely be disposed in the vicinity of the light source 61 by virtue of its good heat resistance characteristics and the thickness of the pre-polarizer unit 62 along the optical axis is sufficiently small, a compact design of the whole system is made possible.

In the configuration as shown in FIG. 8, there is a case that the temperature of the incident side polarizing plate 70 rises extremely, because the S polarized light emitted obliquely from the pre-polarizer 62 enters the incident side polarizing plate 70. In this case, it is preferable that the pre-polarizer 62 is arranged in a manner that the joining edges 41 of the adjacent polarization-selective mirrors 23 are parallel to a plane which contains axes of lights passing through respective centers of pictures of the liquid crystal cells 72, 73 and 74 so that the S polarized light emitted obliquely from the pre-polarizer 62 cannot enter the incident side polarizing plate 70. As a result, its temperature rise can be suppressed.

The embodiment as shown in FIG. 8 is a projection display system which has three liquid crystal panels and one projection lens. However, a projection display system which has three liquid crystal panels and three projection lenses is obtainable. In this system, the color combiner is not necessary; each optical image formed in the respective liquid crystal panel is magnified by each projection lens, and the image is projected and synthesized on the projection screen. The pre-polarizer as shown in FIG. 2 can be used in this system.

In the foregoing embodiments, a liquid-crystal display device is used as the light valve. But, any device such as electro-optic crystal may also be employed as the light valve, as long the device is capable of producing an optical image by varying in optical rotatory power, birefringence or the like in response to the video signal, and that the device is used by combining a polarizing plate at least at its incident side.

As described in the foregoing paragraphs, according to the present invention, it is possible to provide the polarizer unit which has a small thickness and can be made with low manufacturing cost, as a result of the configuration that it comprises a plurality of the polarization-selective mirrors arranged in the zig-zag fashion in its cross-sections, and that the polarization-selective mirrors comprise the glass substrates whose both surfaces are coated with the optical thin films. It is also possible to provide the compact projection display system of low manufacturing cost, capable of displaying the bright projected image of high picture quality for a long time, as a result of improved reliability of the incident side polarizing plate by employing the stated polarizer unit. Thus, the present invention has a great advantage.

EXAMPLE 6—(POLARIZER 3)

Figure 9:
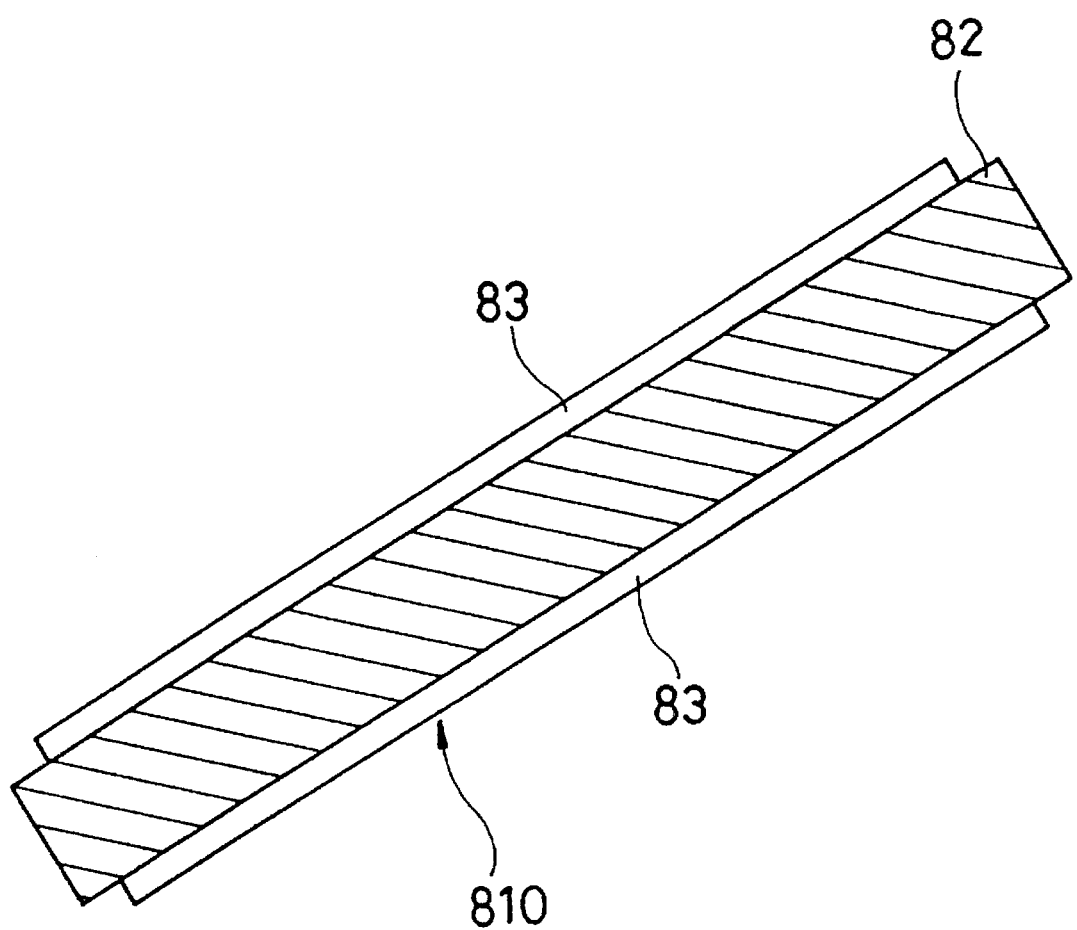
FIG. 9 is a schematic view showing the structure of a further embodiment of the polarizer built in accordance with the present invention.

In addition to the foregoing embodiments, the present invention can also be applied to another polarizer unit for infrared radiation. FIG. 9 is a schematic view showing such an embodiment. The polarization-selective mirror 810 in that case comprises a single crystalline silicon substrate 82 and germanium thin films 83 coated on both the surfaces of the silicon substrate 82 by vapor deposition from a single crystalline germanium. The germanium thin film 83 has a higher refractive index than that of the silicon substrate 82, and both substances are transparent for infrared radiation.

It is preferable to arrange the polarization-selective mirror 810 in a manner that the incident angle $\theta_0$ at which the light enters from the air to the mirror 810 satisfies the formulae (8) and (9), and the thickness d of the germanium thin films 83 satisfies the formula (10) in the main wavelength of the light. In an optimum condition, there are derived: $n_0=1$, $n_1=4.0$, $n_2=3.4$, $\theta_0=78.0°$ and $\theta_1=14.2°$. If the main wavelength is selected as: $\lambda=3000$ nm, there is derived: d=193.4 nm, as summarized in Table 4. At this time, $R_S=0.835$ is derived from the formula (13).

TABLE 4

| | $\theta_0 = 78.0°$, $\lambda = 3000$ nm, | | |
|---|---|---|---|
| Components | Substance | Refractive index | Film thickness (nm) |
| | Air | 1.0 | — |
| Optical thin film | Germanium | 4.0 | 193.4 |
| Substrate | Silicon | 3.4 | — |
| Optical thin film | Germanium | 4.0 | 193.4 |
| | Air | 1.0 | — |

Figure 10:
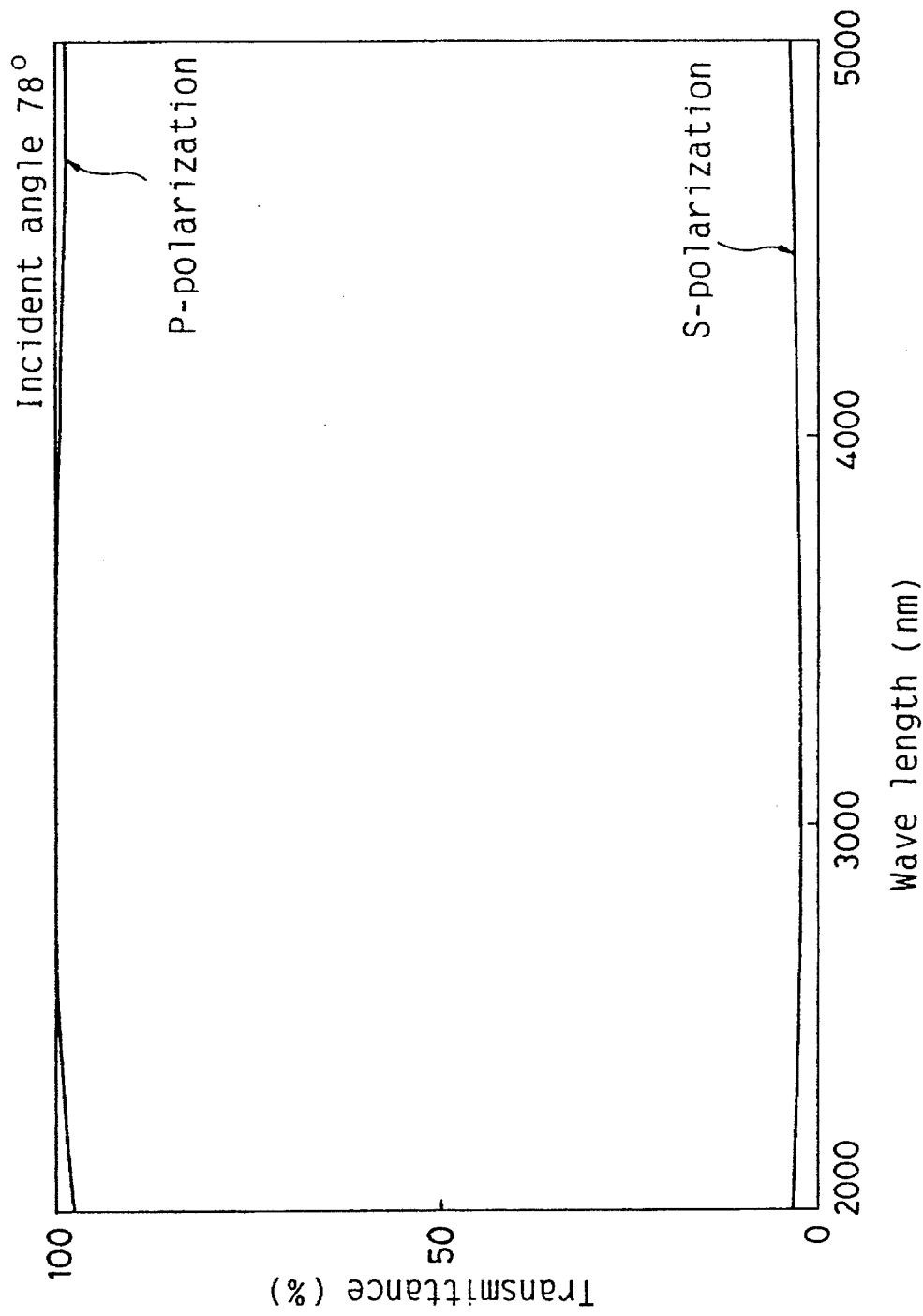
FIG. 10 is a graph showing a spectral transmittance of the polarizer of another embodiment built in accordance with the present invention.

FIG. 10 is a graph showing the spectral transmittance characteristics of the polarization-selective mirror 810 configured as summarized in Table 4, in case where a parallel light beam is incident upon the mirror 810. The value in the graph represents the incident angle at which the light beam enters from the air into the germanium thin film 83. In case where the incident angle $\theta_0$ is 78.0°, which is the quasi-Brewster's angle, the transmittance for the P polarized light in the spectral wavelength in the air of 2000 nm– 5000 nm is no smaller than 95%, while the S polarized light is no more than 5%. Since the polarized light must travel through two optical thin films of the same composition, the overall transmittance for the S polarized light becomes very small value.

The polarizer of this embodiment may also be configured to comprise the zig-zag arranged polarization-selective mirrors, as shown in FIG. 2, depending on its application. In such also, in order to secure the uniformity in the light intensity distribution of the light emitted from the polarizer, it is preferable to use pieces of even number of the polarization-selective mirrors. In addition to this, the transmittance for the S polarized light can further be lowered, when the polarization-selective mirror is configured to comprise two sheets of the mirror sandwiching a thin air layer or a thin gap therebetween as shown in FIG. 5.

EXAMPLE 7—(POLARIZER 4)

Figure 11:
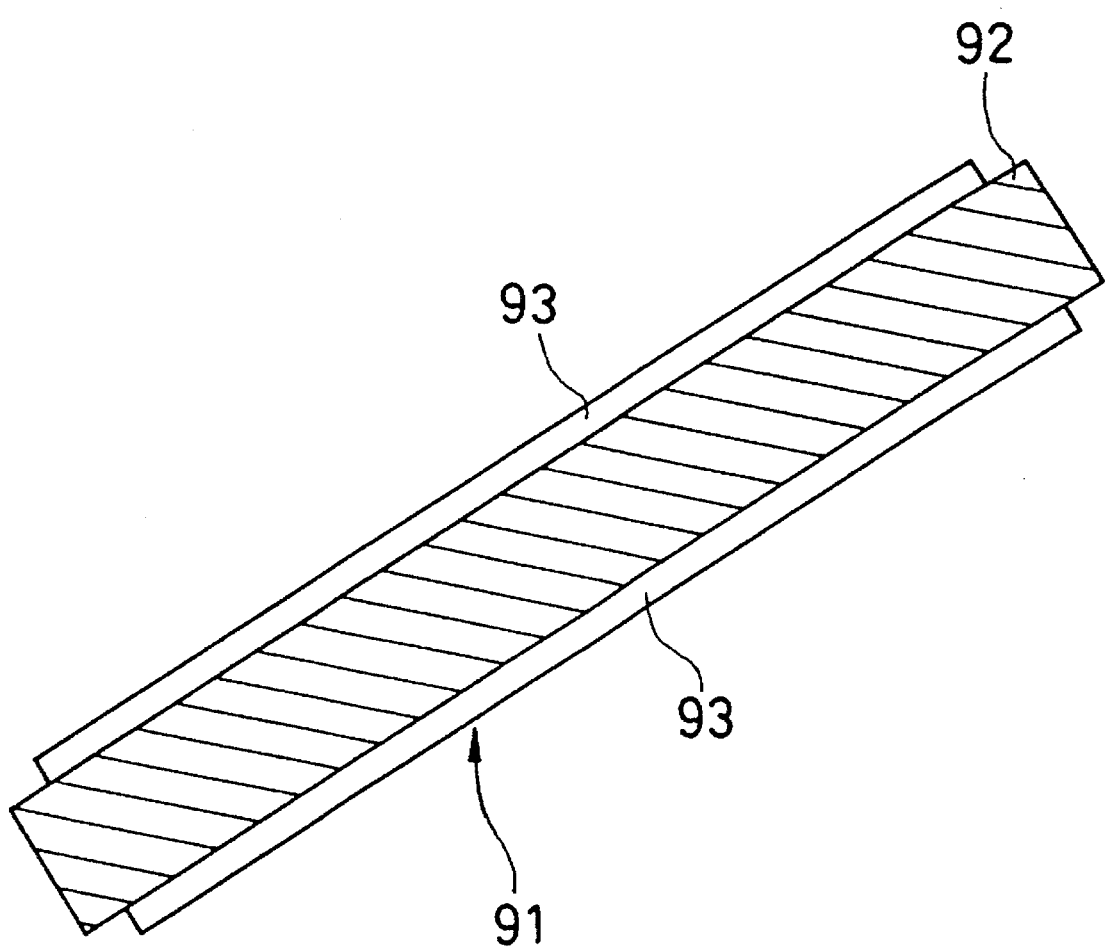
FIG. 11 is a schematic view showing the structure of another embodiment of polarizer built in accordance with the present invention.

FIG. 11 is a schematic view representing another embodiment of the polarizer unit for infrared radiation built in accordance with the present invention. The polarization-selective mirror 91 in that case comprises a single crystal sodium chloride substrate 92 and a pair of silicon thin films 93 which are vapor deposited on both surfaces of the sodium chloride substrate 91. The silicon thin film 93 has a higher refractive index than that of the sodium chloride substrate 92, and both the substances are transparent for the infrared radiation. It Is preferable to arrange the polarization-selective mirror 91 in a manner that the incident angle $\theta_0$ of light entering from the air to the mirror 91 satisfies the formulae (8) and (9) and the thickness d of the silicon thin films 93 satisfy the formula (10) in the main wavelength of the light. In an optimum condition, there are derived: $n_0=1$, $n_1=3.4$, $n_2=1.52$, $\theta_0=80.9°$ and $\theta_1=16.9°$. If the main wavelength is selected as: $\lambda=3000$ nm, there is derived: d=230.5 nm, as summarized in Table 5. At this time, $R_S=0.933$ is derived from the formula (13).

TABLE 5

| | $\theta_0 = 80.9°$, $\lambda = 3000$ nm, | | |
|---|---|---|---|
| Components | Substance | Refractive Index | Film thickness (nm) |
| | Air | 1.0 | — |
| Optical thin film | Silicon | 3.4 | 230.5 |
| Substrate | Sodium chloride | 1.52 | — |
| Optic thin film | Silicon | 3.4 | 230.5 |
| | Air | 1.0 | — |

Figure 12:
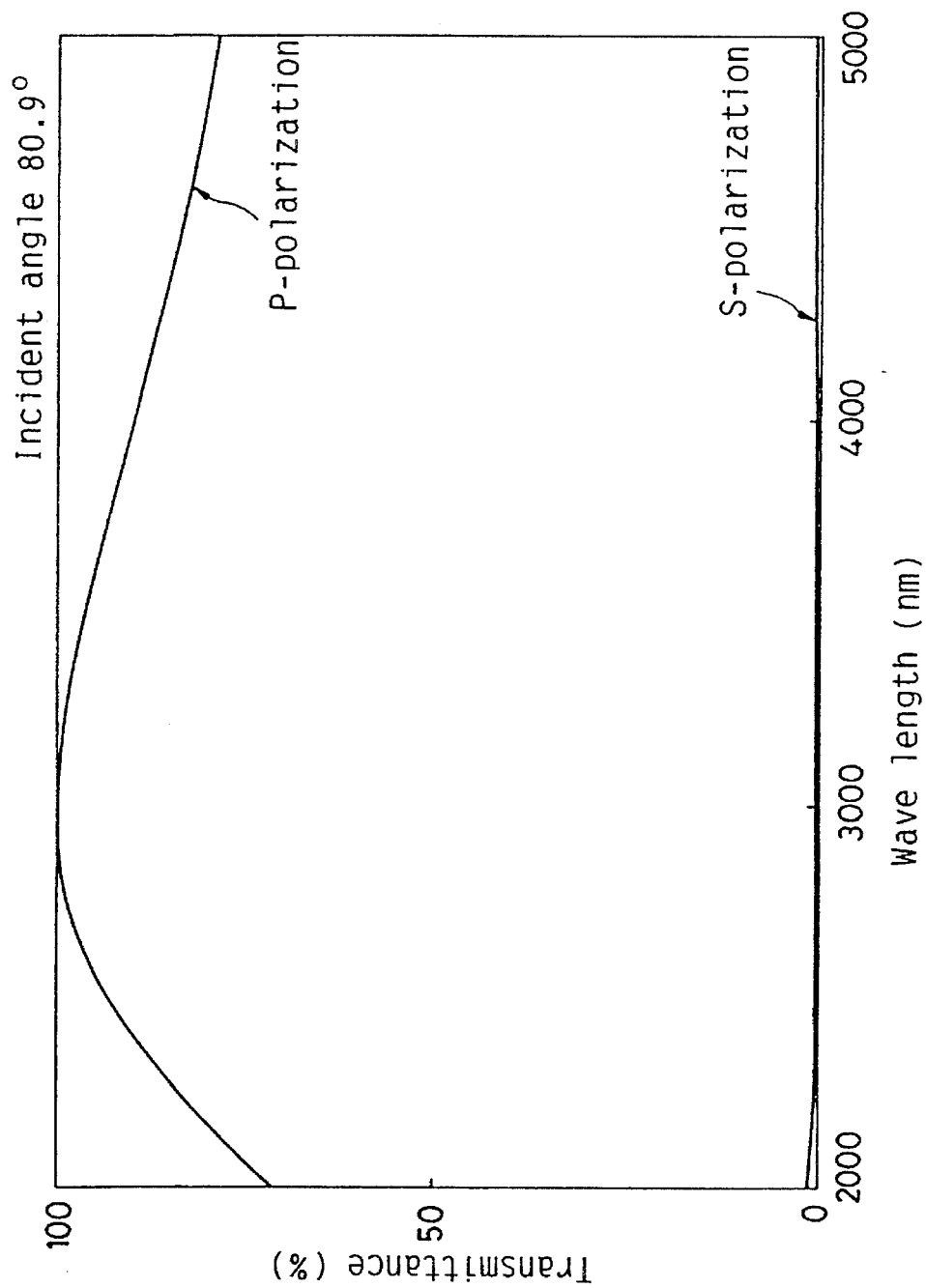
FIG. 12 is a graph showing a spectral transmittance of the polarizer of a further embodiment built in accordance with the present invention.
Figure 13:
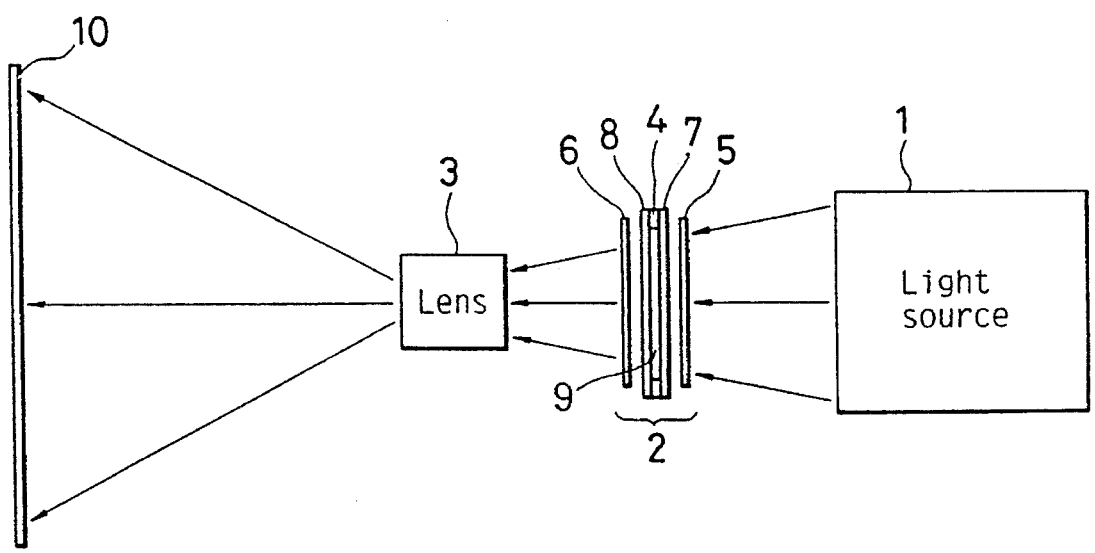
FIG. 13 is a schematic view showing the structure of the conventional projection display system.

FIG. 12 is a graph showing the spectral transmittance characteristics of the polarization-selective mirror 91 configured as summarized in Table 5. In case where a parallel light beam is incident from the air upon the mirror 91. In case where the incident angle $\theta_0$ is 80.9°, being the quasi-Brewster's angle, the transmittance for the P polarized light in the spectral wavelength in the air of 2000 nm–000 nm is no smaller than 70% while that for the S polarized light is no more than 1.5%. Since the polarized light travels through the two optical thin films of the same composition, the overall transmittance for the S polarized light becomes very small value. Other than the exemplified sodium chloride, any one of potassium chloride, calcium difluoride and barium difluoride may be employed as the material for the substrate. Further, germanium may be employed as the material for the thin film instead of the exemplified silicon. The polarizer as shown in FIG. 11 may also be configured to comprise the zig-zag arranged polarization-selective mirrors as shown in depending on its application. In this case also, in order to secure the uniformity in the light intensity distribution of the light emitted from the polarizer, it is preferable to use pieces of even number of the polarization-selective mirrors in one polarizer unit. In addition to this, the transmittance for the S polarized light can further be lowered when the polarization-selective mirror is configured to comprise two sheets of the mirror sandwiching a thin air layer or a thin gap therebetween as shown in FIG. 5. In this case, zinc sulfide, zinc selenide or germanium may be employed as the material for the thin film instead of the exemplified silicon.

As described in the foregoing paragraphs, according to the present invention, it is possible to provide the polarizer unit for in infrared radiation, which has only a small thickness and is of low manufacturing cost. This is achieved by comprising a plurality of the polarization-selective mirrors whose cross-sections are arranged in zig-zag fashion, and each polarization-selective mirrors comprising the substrate and both surface coatings of the optical thin films. Thus, the present invention has a great advantage.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A polarizer comprising: at least one polarization-selective mirror including a substrate made of a substance which is substantially transparent to infrared radiation, and optical thin films with a higher refractive index than that of said substrate disposed on opposite surfaces of said substrate, said at least one mirror being obliquely arranged with respect to a given optical axis such that a transmittance of the polarizer for P polarized light incident upon the polarizer along said optical axis is at a maximum value.

2. The polarizer in accordance with claim 1, wherein said substrate is made from silicon and said optical thin films are made from germanium.

3. The polarizer in accordance with claim 1, wherein said substrate is made from a substance selected from the group consisting of sodium chloride, potassium chloride, calcium difluoride and barium difluoride.

4. The polarizer in accordance with claim 1 wherein said optical thin films are made from a substance selected from the group consisting of silicon and germanium.

5. The polarizer in accordance with claim 1, wherein a plurality of said polarization-selective mirrors are provided, and further comprising a framework for supporting said plurality of polarization-selective mirrors in zig-zag fashion.

6. The polarizer in accordance with claim 5, wherein an even number of said polarization-selective mirrors are provided.

7. The polarizer in accordance with claim 1, wherein a plurality of polarization-selective mirrors are provided, and wherein at least two of said polarization-selective mirrors are disposed in spaced parallel relation with one another so as to sandwich a thin air layer or a thin gap therebetween.

8. The polarizer in accordance with claim 7, wherein a plurality of said polarization-selective mirrors are provided, and further comprising a framework which supports said polarization-selective mirrors in such a fashion as to form at least two mirror units each forming a zig-zag pattern, said mirror units being concentrically arranged so as to sandwich a zig-zag shaped gap therebetween such that a transmittance of the polarizer for P polarized infrared radiation incident upon the polarizer along said optical axis is at a maximum value.

9. The polarizer in accordance with claim 8, wherein an even number of mirror units are supported by said framework.

10. A polarizer comprising: at least one polarization-selective mirror including a substrate made of a substance which is substantially transparent to infrared radiation, and optical thin films with a higher refractive index than that of said substrate disposed on opposite surfaces of said substrate, said at least one mirror being obliquely arranged with respect to a given optical axis such that a transmittance of the polarizer for P polarized light incident upon the polarizer along said optical axis is at a maximum value, said polarizer satisfying the following conditions:

$$\frac{n_1^2}{\cos^2 \theta_1} = \frac{n_0 n_2}{\cos \theta_0 \cos \theta_2}$$

and $$d = \frac{\lambda}{4 n_1 \cos \theta_1},$$

where $n_0$ represents a refractive index of an exterior medium; $n_1$ represents a refractive index of the optical thin films; $n_2$ represents a refractive index of the substrate; d represents a thickness of the optical thin films; $\theta_0$ represents an incident angle at which the light enters from the exterior medium into the optical thin film; $\theta_1$ represents an angle of refraction of infrared radiation in said optical thin film; $\theta_2$ represents an angle of refraction of infrared radiation in said substrate; and $\lambda$ represents a main wavelength of infrared radiation traveling through air.

11. The polarizer in accordance with claim 10, wherein said substrate is made from silicon and said optical thin films are made from germanium.

12. The polarizer in accordance with claim 10, wherein said substrate is made from a substance selected from the group consisting of sodium chloride, potassium chloride, calcium difluoride and barium difluoride.

13. The polarizer in accordance with claim 10, wherein said optical thin films are made from a substance selected from the group consisting of silicon and germanium.

14. The polarizer in accordance with claim 10, wherein a plurality of said polarization-selective mirrors are provided, and further comprising a framework for supporting said plurality of polarization-selective mirrors in zig-zag fashion.

15. The polarizer in accordance with claim 10, wherein an even number of said polarization-selective mirrors are provided.

16. The polarizer in accordance with claim 10, wherein a plurality of polarization-selective mirrors are provided, and wherein at least two of said polarization-selective mirrors are disposed in spaced parallel relation with one another so as to sandwich a thin air layer or a thin gap therebetween.

17. The polarizer in accordance with claim 10, wherein a plurality of said polarization-selective mirrors are provided, and further comprising a framework which supports said polarization-selective mirrors in such fashion as to form at least two mirror units each forming a zig-zag pattern, said mirror units being concentrically arranged so as to sandwich a zig-zag shaped gap therebetween such that a transmittance of the polarizer for P polarized infrared radiation incident upon the polarizer along said optical axis is at a maximum value.

18. The polarizer in accordance with claim 10, wherein an even number of mirror units are supported by said framework.

* * * * *